O. C. HOUGHTON.
STRIPPER FOR COTTON PICKERS.
APPLICATION FILED AUG. 17, 1910.
982,676.
Patented Jan. 24, 1911.
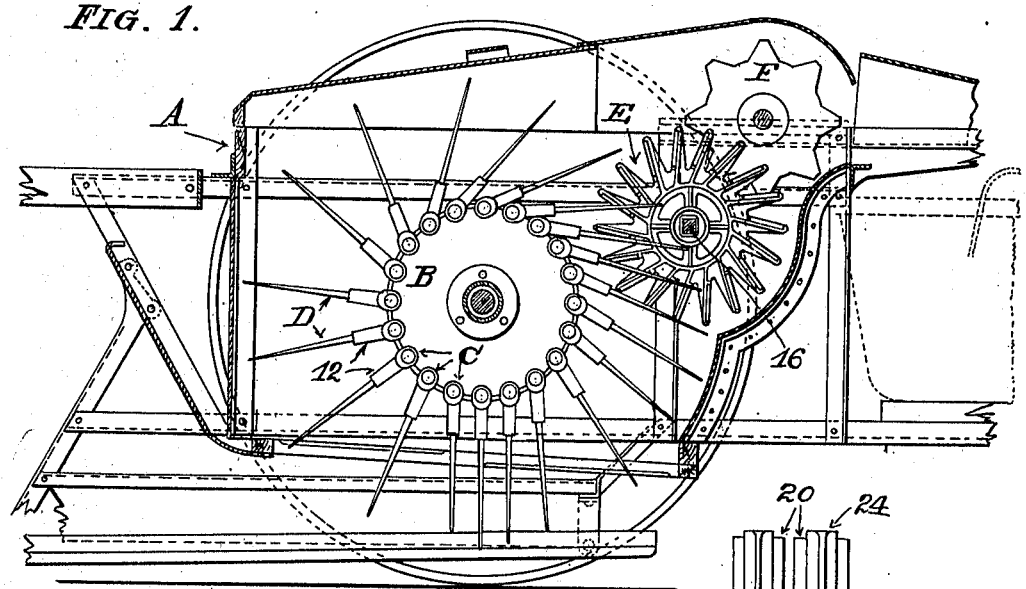
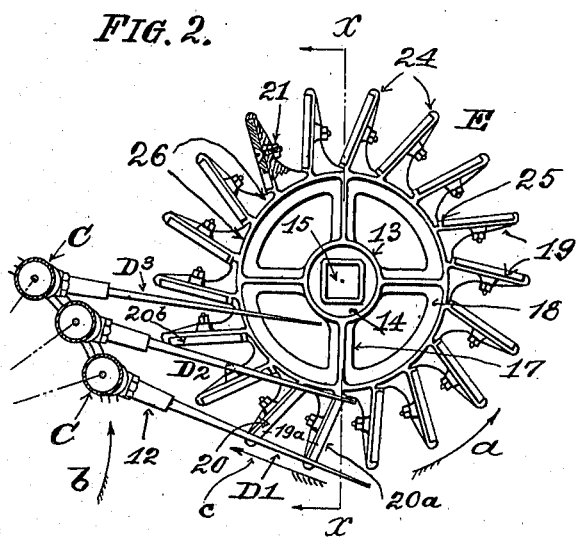
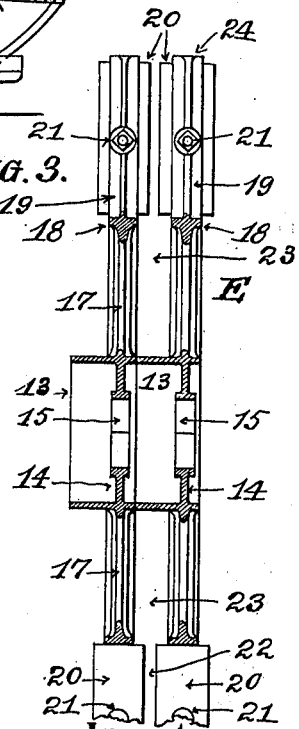
Witnesses:
C. B. Knudsen
A. G. Peterson
Inventor:
Orley C. Houghton,
By Michael J. Stark & Sons,
Attorneys.

UNITED STATES PATENT OFFICE.

ORLEY C. HOUGHTON, OF CHICAGO, ILLINOIS, ASSIGNOR TO HENRY E. BULLOCK AND JAMES E. BULLOCK, OF CHICAGO, ILLINOIS.

STRIPPER FOR COTTON-PICKERS.

982,676.     Specification of Letters Patent.    Patented Jan. 24, 1911.

Application filed August 17, 1910. Serial No. 577,606.

*To all whom it may concern:*

Be it known that I, ORLEY C. HOUGHTON, a citizen of the United States, and resident of Chicago, in the county of Cook and State of Illinois, have invented certain new and useful Improvements in Strippers for Cotton-Pickers; and I do hereby declare that the following description of my said invention, taken in connection with the accompanying sheet of drawings, forms a full, clear, and exact specification, which will enable others skilled in the art to which it appertains to make and use the same.

This invention has general reference to cotton pickers, and it relates especially to that class of cotton harvesters in which rotating picking stems are employed to remove cotton lint from cotton plants, said picking stems being mounted in columns journaled in a cylinder. In this class of picking machines there is generally a rotating stripper that removes the cotton from the picking spindles, and a rotating cleaner that removes the cotton from the stripper and forces the picked cotton backward toward a container adapted to receive said cotton. In this class of cotton pickers the stripper has heretofore been generally, if not exclusively, made from wood built up in sections or segments, iron having been considered undesirable for the object in view, and these wooden strippers, besides being very expensive, are open to the objection that when exposed to dampness, they will warp out of shape, split, and rapidly deteriorate so that frequent renewals are necessary to keep a machine in proper working order.

To avoid these objections and drawbacks, which is the object of my present invention, I produce this stripper comprising a number of separate members of iron or steel casting, and, to retain the desirable qualities of wood, I face the stripping members with plates of an elastic material, such as wood, fiber, rubber, or other suitable substance.

In the wooden strippers heretofore used, the grooves therein, which receive the picking spindles when stripping the cotton therefrom, are parallel from their edges to the center, which I have found objectionable owing to the fact that should cotton lint adhere to the spindles when passing through the said grooves, as will sometimes happen, this cotton will be tightly pressed upon the respective spindle or spindles, and is then difficult to remove, in fact I have frequently been compelled to stop the machine when in actual use in the cotton field, to cut away with a knife the cotton thus tightly pressed onto the spindle. I have overcome this drawback in my present stripper by widening the spaces between the flanks of the stripper wheels toward the center thereof so that when cotton lint is not stripped from the picking spindles, it will freely pass through the space between the stripping wheels.

My invention, therefore, resides in the novel and peculiar construction of the stripper, as hereinafter first fully set forth and described and then pointed out in the claims.

In the drawings already mentioned, which serve to illustrate this invention more fully, Figure 1 is a sectional elevation of a cotton harvesting machine showing the application of my improved stripper. Fig. 2 is a side view of the stripper wheel and several of the picking spindles. Fig. 3 is a sectional view taken on line *x x* of Fig. 2.

Like parts are designated by corresponding characters and symbols of reference in all the figures.

Briefly described this cotton harvester includes a machine body A, the details of construction of which are well known so that I deem it unnecessary to enter into a detailed description thereof. In this machine body there is located the picking mechanism including a cylinder B, in the end-plates of which there are journaled a series of columns C, in each of which there are mounted a multiplicity of picking spindles D, which rotate in bearings 12, on said columns. In this machine body there are, furthermore, located the stripper E, and a cleaner F, as clearly shown in Fig. 1. This stripper E is formed of separate members in the process of casting in metal, and each member consists of a central tubular hub 13, in which there is a web 14, which has a preferably square, central opening 15, for the reception of a correspondingly shaped shaft 16, Fig. 1, by which the stripper is rotated by mechanism not shown. From the tubular hub 13 radiate spokes 17, which terminate in an annular rim or ring 18. From this rim project, angularly with respect to a radial line from the center of the rim, a series of arms 19, to one face of which there are secured plates 20, preferably by countersunk bolts 21, one of which is illustrated in Fig. 2. These face plates are of a width to afford between them spaces 22, through which the free ends of the picking spindles will just pass, while the spaces 23, between the rims and the spokes are considerably wider, as will hereinafter more fully appear.

In order to retain the plates 20 in proper and secure position on the arms 19, there are formed at the outer ends thereof noses or projections 24, engaging one end of the plates 20, and near the annular rim 18, there are formed projections 25, engaging the other ends of said plates in a manner readily comprehended.

By reference to Fig. 2, it will be noticed that the stripper wheel E rotates in the direction designated by an arrow and the reference letter $a$, and that the spindles, three of which are shown, to illustrate the operation of the stripper, rotate in the direction of the arrow marked with the letter $b$. I shall now assume that the stripper wheel E is rotating and that the picking finger indicated by the character $D^1$, in its rotation with the cylinder, approaches the stripper wheel. In this position the arms $19^a$, with their plates 20, $20^a$, engage this picking finger about midway, the faces of the plates 20, $20^a$, being nearly at right angles to the center line of said spindle, and while these plates move toward the free end of the picking finger, strip the cotton therefrom, the finger at the same time moving in the direction of rotation of the cylinder, but owing to the relative positions of the centers of rotation of the cylinder and the stripper, the movement of the picking finger relative to the stripper is a compound one which places the picking finger nearly all the time at right angles to the faces of the stripping plates. Assume now that the picking spindle $D^1$ has reached the position of the picking spindle $D^2$. Here the plate $20^b$ reaches the spindle close to the base thereof to strip any cotton that has not been removed by the preceding plates while the free end of the spindle passes the rim and enters the space 23 so that should any cotton lint be left on the picking finger, it will freely pass through the space 23.

It is obvious that there are upon the stripper shaft 16, one more stripping member E than there are spindles in one column and of which there are usually from seven to ten, this being necessary to insure that each picking spindle is flanked by two stripping members. These stripping members are preferably mounted upon a square shaft so that all the arms thereof are in alinement which is necessary to secure proper stripping of cotton and preventing bending of the spindles. The hubs 13 of the several stripper members are made long enough to properly space these members upon their common shaft without further means to properly locate the same. These members E are all alike so that substitution in case of an accident or for other reasons may be readily made without loss of time.

I have heretofore described, and in the drawings, Fig. 1, I have illustrated that type of cotton harvesters in which the picking spindles rotate in vertical planes parallel with the movement of the machine, but it is evident that this improved stripper may also be employed in machines where the picking spindles rotate in horizontal planes, without change or modification.

I have heretofore described the stripper wheel as having spokes that connect the hubs with the rims, but it is obvious that solid webs may be substituted for the spokes without departing from this invention. Attention is now directed to the fact that the stripper E makes approximately three revolutions to one revolution of the cylinder, so that while I have described the position of the picking spindles shown in Fig. 2, with reference to the arms and plates which they approach and pass, it must be understood that each picking spindle, as it passes the stripper, receives the stripping effect of quite a number of the plates that follow each other in rapid succession. Attention is further called to the fact that should for any reason whatever cotton lint collect in the spaces between the spokes and the rims of the stripping members, such loose cotton can and will readily escape therefrom, or be drawn therefrom by the picking spindles through the spaces 26 between the arms 19, which spaces are large enough for this object.

Having thus fully described this invention, I claim as new and desire to secure to me by Letters Patent of the United States—

1. In a cotton harvester having axially rotating picking spindles as described, a stripper adapted to strip the cotton from said picking spindles, said stripper comprising a series of metallic centers each of which is provided with a plurality of outwardly projecting arms, each of said arms being faced with an elastic plate, said plates being wider than the body of said centers and removably secured to said arms, said centers being spaced apart by hubs projecting from the webs of said centers, as stated.

2. In a cotton harvester of the type having axially rotating picking spindles, a rotating stripper adapted to remove cotton lint from said spindles, said stripper comprising a plurality of separate wheels each of said wheels being mounted upon an angular shaft in close proximity to one another and having a hub adapted to space said wheels, spokes radiating from said hub, an annular rim with which said spokes connect, and a plurality of arms projecting angularly from said rim, each of said arms being fitted with a plate on its advancing side, said plate being of an elastic material and removably fastened to said arm each of said arms having projections adapted to engage the ends of its own plate, said plates being wider than the arms and in alinement when the wheels are assembled.

In testimony that I claim the foregoing as my invention, I have hereunto set my hand in the presence of two subscribing witnesses.

ORLEY C. HOUGHTON.

Witnesses:
MICHAEL J. STARK,
RICHARD J. WUERST.